(12) United States Patent
Linsky et al.

(10) Patent No.: US 7,068,974 B1
(45) Date of Patent: Jun. 27, 2006

(54) BEAM HOPPING SELF ADDRESSED PACKET SWITCHED COMMUNICATION SYSTEM WITH POWER GATING

(75) Inventors: Stuart T. Linsky, San Pedro, CA (US); Mark E. Bever, Redondo Beach, CA (US); Fred C. Tramm, Rancho Palos Verdes, CA (US); Esmaell Yousefi, Manhattan Beach, CA (US); Reginald Jue, Manhattan Beach, CA (US); Scott A. Cooper, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1023 days.

(21) Appl. No.: 09/599,148

(22) Filed: Jun. 21, 2000

(51) Int. Cl.
*H04B 7/185* (2006.01)

(52) U.S. Cl. ............... 455/12.1; 455/13.4; 455/127.1; 455/127.5; 455/427; 455/428; 455/522; 370/316

(58) Field of Classification Search ............... 455/427, 455/428, 13.4, 12.1, 13.1, 13.3, 429, 13.2, 455/127.1, 127.5, 522; 370/316
See application file for complete search history.

(56) References Cited

U.S. PATENT DOCUMENTS

| | | | |
|---|---|---|---|
| 3,611,372 A | * | 10/1971 | Fishbein .................. 342/109 |
| 3,860,926 A | * | 1/1975 | Gillmer .................... 342/132 |
| 5,870,396 A | | 2/1999 | Abu-Amara et al. |
| 6,091,934 A | * | 7/2000 | Berman et al. ............. 455/13.4 |
| 6,377,561 B1 | * | 4/2002 | Black et al. ................ 370/330 |
| 6,430,393 B1 | * | 8/2002 | Rosen et al. ............... 455/12.1 |
| 6,496,706 B1 | * | 12/2002 | Jou et al. ................... 455/522 |

FOREIGN PATENT DOCUMENTS

| | | |
|---|---|---|
| EP | 0 416 462 A | 3/1991 |
| EP | 0 805 568 B1 | 1/1999 |
| EP | 0 889 605 A | 1/1999 |
| EP | 0 987 837 A | 3/2000 |
| GB | 2 336 508 A | 10/1999 |

* cited by examiner

*Primary Examiner*—Edan Orgad
(74) *Attorney, Agent, or Firm*—Posz Law Group, PLC

(57) ABSTRACT

A downlink beam frame signal processing system (100) for a communication satellite includes a packet switch (608) that routes self addressed uplink data to a memory (804). The memory (804) stores queues for at least a first and a second downlink beam hop locations (302, 304). The processing system (100) also includes a power amplifier (108) that amplifies a waveform formed using the uplink data. A power gating circuit (1200) coupled to the power amplifier (108) includes a power gate input (1216) responsive to a power gating signal to remove RF power from at least a portion of the waveform before transmission.

22 Claims, 13 Drawing Sheets

BEAM HOPPING SELF ADDRESSED PACKET SWITCHED COMMUNICATION SYSTEM WITH POWER GATING

CROSS-REFERENCE TO RELATED APPLICATIONS

This application is related to titled "Beam Hopping Self Addressed Packet Switched Communication System with Multi-port Memory", filed Jun. 21, 2000 as Ser. No. 09/599, 035 (now abandoned), titled "Beam Hopping Self Addressed Packet Switched Communication System with Locally Intelligent Scheduling", filed Jun. 21, 2000 as Ser. No. 09/599, 041; titled "Beam Hopping Self Addressed Packet Switched Communication System with Multiple Beam Array Antenna", filed Jun. 21, 2000 as Ser. No. 09/599,150; titled "Gated Power Time Division Downlink for a Processing Satellite", filed Mar. 16, 1999 as Ser. No. 09/270,361; and title "Beam Hopped Gated Power Time Division Downlink", filed Jun. 21, 2000 as Ser. No. 09/599,042.

BACKGROUND OF THE INVENTION

The present invention relates to satellite communication systems. In particular, the present invention relates to a beam hopping satellite communication system including a self addressed packet switch that power gates a downlink beam.

Satellites have long been used to provide communications capabilities on a global scale. Since the inception of the modern communications satellite, however, one factor has remained constant: the limited availability of power on board the satellite. The limited availability of power persists today even in the face of tremendous advances in satellite technology.

The communications reception equipment used to receive the uplink and the transmission equipment used to generate the downlink are significant drains on satellite power. The transmission equipment in particular often requires 50% or more of the total power generated by a satellite. Furthermore, downlink power amplifiers are far from 100% efficient and therefore waste power whenever they are active.

Any undue drain on satellite power is undesirable. Thus, for instance, limitations on satellite power may prevent a satellite from encoding and decoding heavier and more robust coding techniques. As another example, limited satellite power may reduce the number and type of observational or sensing functions which a satellite may perform, or the number of downlinks and uplinks a satellite may support.

In addition, as satellite technology has progressed, it has become more common for satellites to process their uplinks. In other words, the satellite may decode, process, route, queue, and otherwise manipulate data before recoding and packaging the data into downlink frames. Thus, the utilization of the downlink depends on the amount of data ready and waiting to be transmitted. Transmitting partially empty frames can be a waste of power, and can have detrimental impacts on the satellite performance through unnecessary servicing of queues, for example.

A need has long existed in the industry for a communication system that addresses the problems noted above and others previously experienced.

BRIEF SUMMARY OF THE INVENTION

A preferred embodiment of the present invention provides a downlink beam frame signal processing system for a communication satellite. The processing system includes a packet switch that routes self addressed uplink data to a memory. The memory stores queues for at least a first and a second downlink beam hop locations. The processing system also includes a power amplifier that amplifies a waveform formed using the uplink data. A power gating circuit coupled to the power amplifier includes a power gate input responsive to a power gating signal to remove power from at least a portion of the waveform before transmission.

The power gating signal may be asserted in response to unavailability of downlink data in the memory. As examples, the power gating signal may be asserted when there is not enough data in the memory to fill one or more payload fields in the waveform, in order to meet satellite power requirements, in response to statistical multiplexing estimates, or to meet desired average queue depths.

Another preferred embodiment of the present invention provides a method for processing a downlink beam frame signal. The method includes the step of switching self addressed uplink data into at least one of a first and second downlink hop location storage area in a memory, amplifying a waveform based in part on the uplink data for transmission, and prior to transmission of the frame signal, power gating at least a portion of the frame signal in response to a power gating signal.

As noted above, the frame signal may be power gated at many different times for many different reasons. However, preferably at least one synchronization field is maintained in the frame signal.

DETAILED DESCRIPTION OF THE INVENTION

Figure 1:
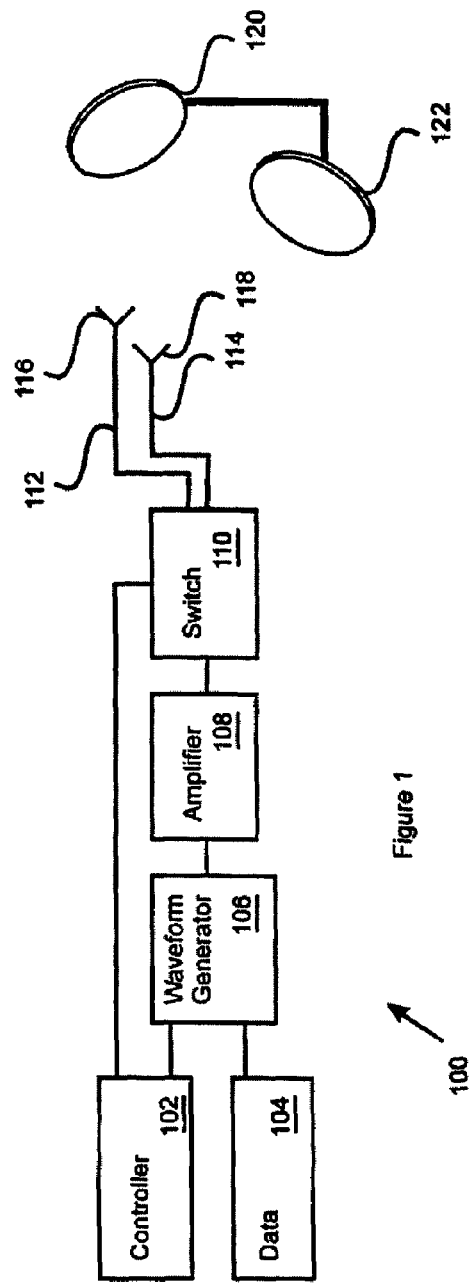
FIG. 1 illustrates a block diagram of a bandwidth switch with waveform processing chain.

Turning now to FIG. 1, that figure shows a block diagram of a downlink beam processing system or bandwidth switch 100. The bandwidth switch 100 includes a controller 102 and a waveform processing chain that operates on data provided by the data source 104. In particular, the waveform processing chain includes a waveform generator 106, an amplifier 108, and a feed switch 110. The waveform processing chain further includes a first feed path 112 and a second feed path 114 that may be characterized by a polarization effect on the waveform that propagates along the feed paths 112–114. The polarization effect may induce, for example, clockwise (right) or counter clockwise (left) polarization in the waveform.

The first feed path 112 terminates in a first radiating element 116 (e.g., a feed horn). Similarly, the second feed path terminates in a second radiating element 118 (e.g., another feed horn). The first and second feed horns 116, 118 illuminate the subreflector 120. The subreflector 120, in turn, illuminates the main reflector 122 that projects downlink beams onto terrestrial cells. Thus, the first and second feed horns 116, 118, the subreflector 120, and the main reflector 122 form a Multiple Beam Array Antenna (MBA) to direct spot beam coverage to distinct terrestrial cells. Additional feed horns may be used with the MBA to generate additional spot beams, and multiple independent MBAs may be provided.

The waveform generator 106 accepts baseband data from the data source 104 and creates a waveform to be transmitted (after amplification by the amplifier 108). The switch 110 selects the particular feed path 112–114 along which the waveform propagates (and thus, in certain embodiments, the polarization and/or hop location associated with the waveform).

The controller 102 exercises color control over the waveform to be transmitted. Thus, the controller 102 may output one or more control signals (collectively referred to as a color selection signal) that determine, for example, the frequency, polarization, or hop location of the waveform to be transmitted. In the preferred embodiment, the beam color components include Even and Odd hop locations, Left and Right polarization, and first and second frequencies. Eight different colors are therefore available: 1EL, 1ER, 1OL, 1OR, 2EL, 2ER, 2OL, 2OR.

Figure 2:
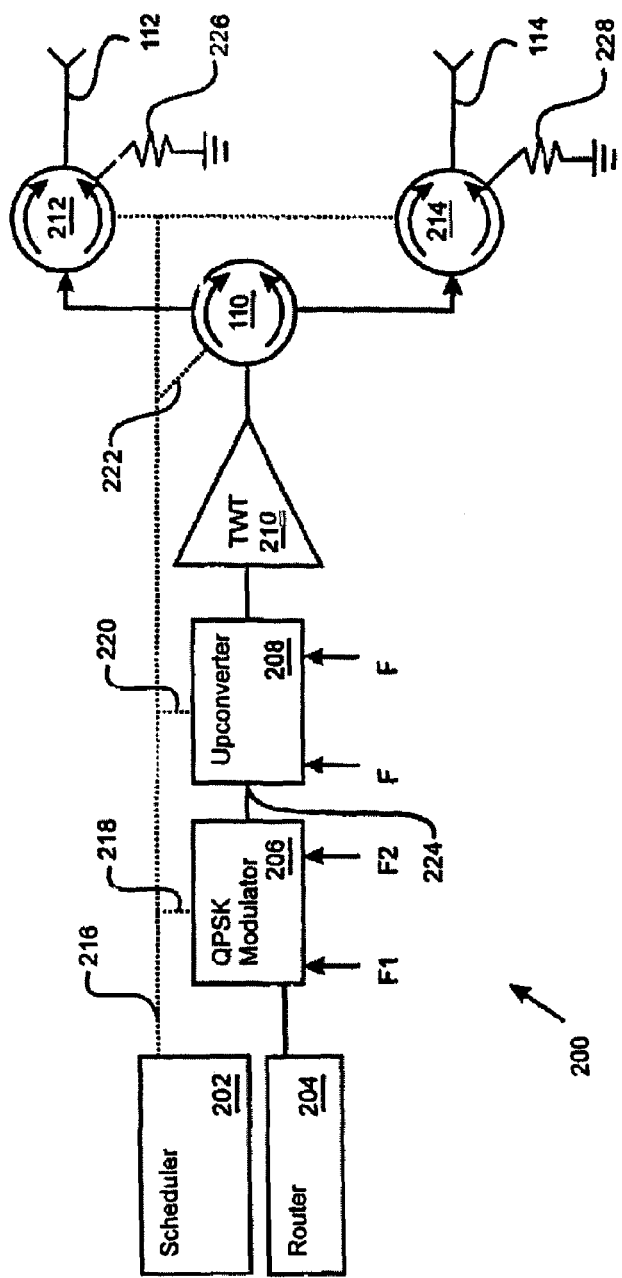
FIG. 2 shows a detailed block diagram of a bandwidth switch with waveform processing chain.

With regard to FIG. 2, a more specific implementation of a downlink beam processing system and bandwidth switch 200 is shown. The bandwidth switch 200 includes a data scheduler 202, a data router 204, and a waveform processing chain including a QPSK modulator 206, an upconverter 208, and a traveling wave tube amplifier (TWTA) 210. The switch 110 is illustrated in FIG. 2 as a ferrite switch 110 that directs the waveform to be transmitted through either the first feed path 112 or the second feed path 114. Preferably, additional ferrite switches 212 and 214 in the feed paths 112–114 provide additional signal isolation (e.g., approximately 20 db between input and output when the ferrite switch is off). The additional ferrite switches 212–214 operate under control of the color selection output to pass or block a waveform to be transmitted through the feed paths 112–114. In other words, when the waveform to be transmitted is destined for the feed 112, then the ferrite switch 214 is coupled through the load 228 to ground. Similarly, when the waveform to be transmitted is destined for the feed 114, then the ferrite switch 212 is coupled through the load 226 to ground.

In addition, FIG. 2 shows a color selection output 216, two frequency selection inputs 218 and 220, a feed path selection input 222, and an intermediate waveform output 224.

During operation, the bandwidth switch 200 accepts baseband data from the router 204 (e.g., an ATM cell router), and creates a waveform to be transmitted using the waveform processing chain. The waveform processing starts by directly converting baseband I and Q data to an intermediate frequency of, for example, 750 MHz. The waveform processing then selects one of F1 (e.g., 3.175 MHz) and F2 (e.g., 3.425 MHz) and one of F3 (e.g., 16 GHz) and F4 (e.g., 17.4 GHz) to produce a waveform to be transmitted with a final center frequency at one of 18.425 GHz, 18.675 GHz, 19.825 GHz, and 20.075 GHz. The scheduler 202 monitors the propagation of data through the waveform processing chain and determines the color of the waveform to be transmitted. To that end, the scheduler 202 provides the color selection output 216 that indicates, as examples, the frequency, polarization, and hop location for the waveform to be transmitted.

The TWTA 210 amplifies the waveform to be transmitted, while the switch 110 determines along which feed path 112–114 (or additional feed paths) the amplified waveform will propagate. To that end, the switch 110 includes the feed path selection input 222 responsive to information on the color selection output 216 (e.g., a hop selection signal). Because the feed paths 112–114 are generally (though not necessarily) associated with feed horns that produce spot beams in different hop locations, the hop selection signal acts to determine the hop location of the waveform to be transmitted. The hop locations below are designated Even or Odd, but are not restricted to even or odd frames. Instead Even and Odd generally designate mutually exclusive time periods.

In addition, either of the feed paths 112–114 may be characterized by a polarization effect on the waveform that propagates along the feed path. Thus, the color selection output 216 may also determine the polarization color component of the waveform to be transmitted. Optionally, however, separate feed paths may be provided for any number of desired combinations of polarization and hop location. The transmitted waveform manifests itself as a beam spot that, typically, provides downlink bandwidth for a terrestrial cell.

The bandwidth switch 200 may operate onboard a first satellite that supports a cellular coverage area using a set of spot beams. The scheduler 202 ensures that the waveforms to be transmitted have the appropriate beam colors to minimize co-channel, adjacent channel, and cross polarization for the cellular coverage area and the eight possible beam colors. However, when, for example, a second subsequently launched satellite begins to provide bandwidth support for the same cellular coverage area, the bandwidth switch 200 allows the first satellite to modify its beam colors to accommodate the second satellite. In other words, the bandwidth switch 200 allows the first and second assignment of spot beams to the coverage area to coexist in a minimally interfering manner. The resultant beam laydown may then be minimally interfering initially for a single satellite, and later reconfigured to be minimally interfering with regard to a particular type of interference or interferences for additional satellites providing bandwidth for the same coverage area.

Figure 3:
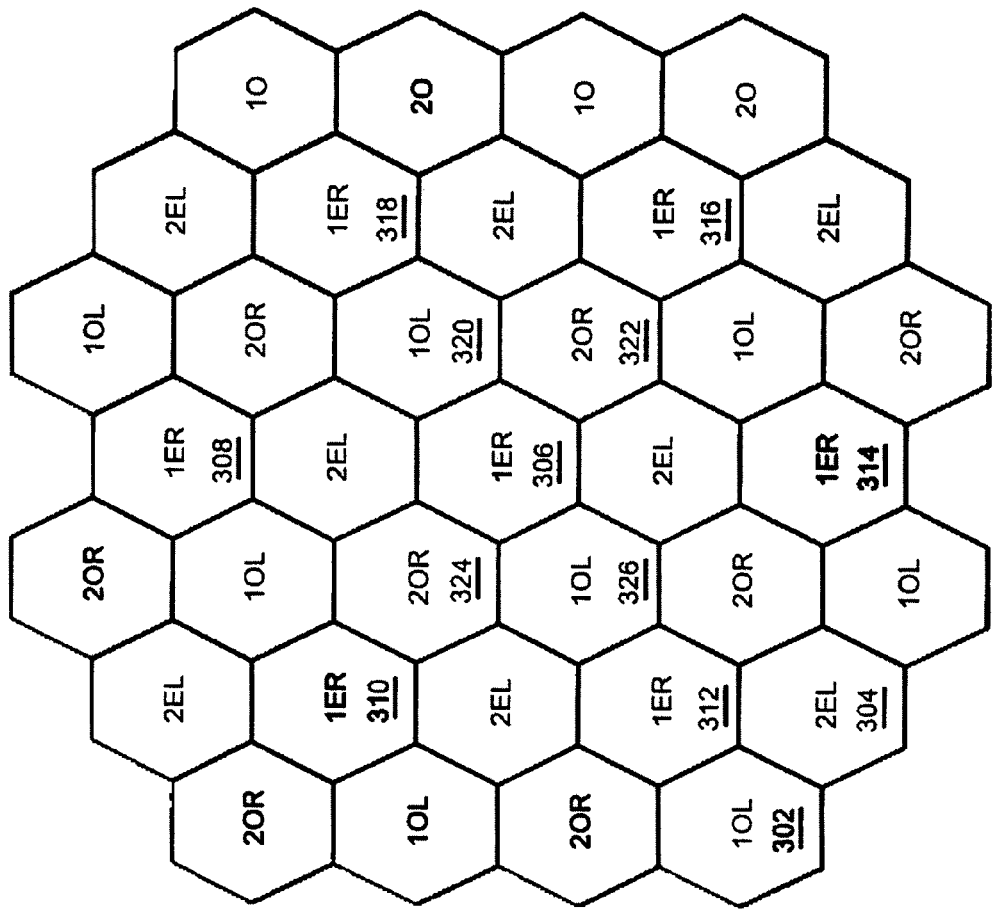
FIGS. 3 illustrates a beam laydown showing both even and odd hop downlink beam color assignments.

Turning next to FIG. 3, that figure illustrates a beam laydown 300 that uses hopping beams. The coverage area is generally divided into cells as shown in idealized form, for example, by the hexagonal cells 302 and 304. Each of the cells is also labeled with a beam color. For example, a beam of color 1OL provides bandwidth for the cell 302, while a beam of color 2EL provides bandwidth for the cell 304.

The laydown 300 is characterized in that, for mutually exclusive hop locations, a only six co-channel interferers (CCI) (caused by a beam of the same color), zero adjacent channel interferers (ACI) (caused by a beam differing in only one color component), and zero cross polarization interferers (XPI) (caused by a beam differing only in polarization) exist for any given cell. In other words, taking cell 306 (color 1ER) as an example, the CCIs are cells 308, 310, 312, 314, 316, and 318.

Note that cell 320 does not provide CCI because it has an odd color component and is not provided with spot beam energy at the same time as the cell 306 (color 1ER) (i.e., the hop locations are mutually exclusive). The laydown 300 also provides minimal interference when hop locations are non-mutually exclusive. In the non-mutually exclusive case, there exist only 6 CCIs, 2 ACIs, and 2 XPIs. The ACIs are cells 322 and 324, while the XPIs are cells 320 and 326. Note that not all colors (e.g., 2OL) need be used in a beam hopping beam laydown.

Figure 4:
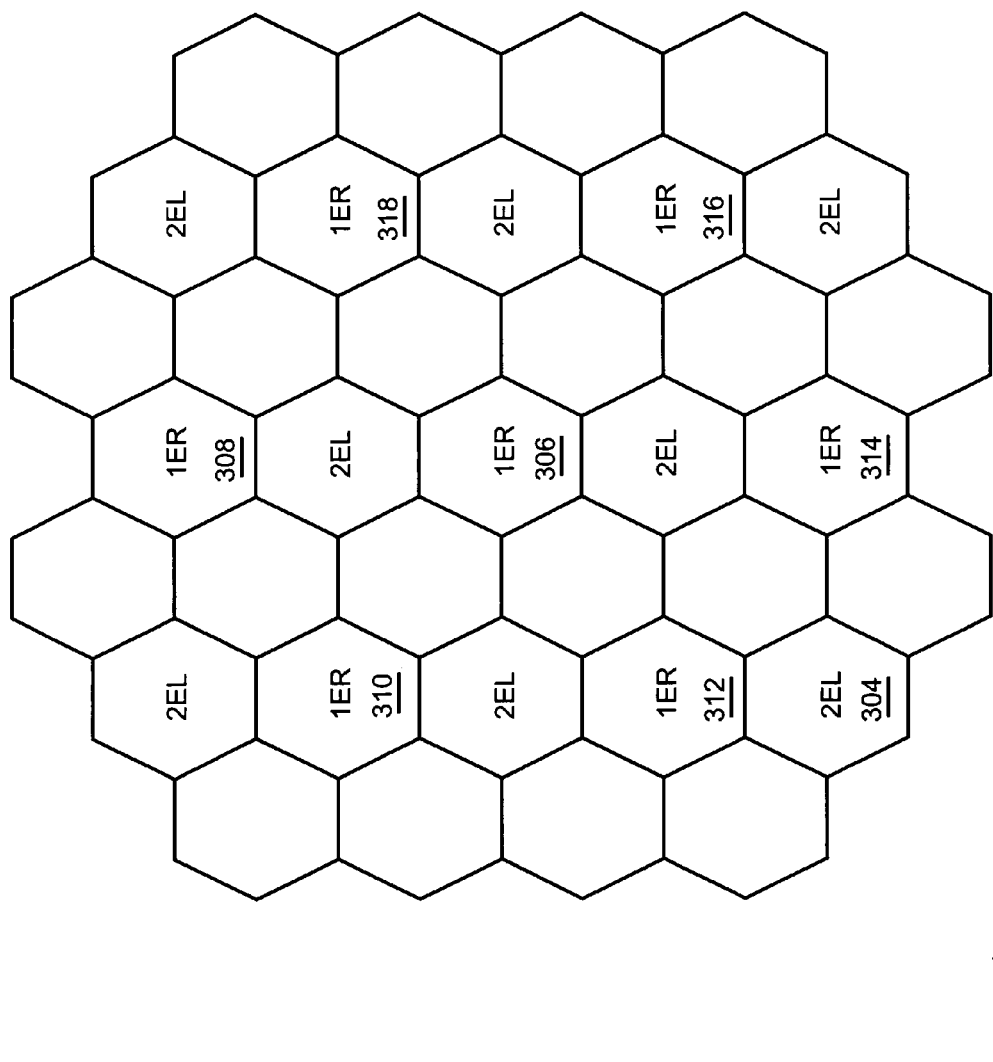
FIG. 4 shows the even hop downlink beams from the beam laydown of FIG. 3.
Figure 5:
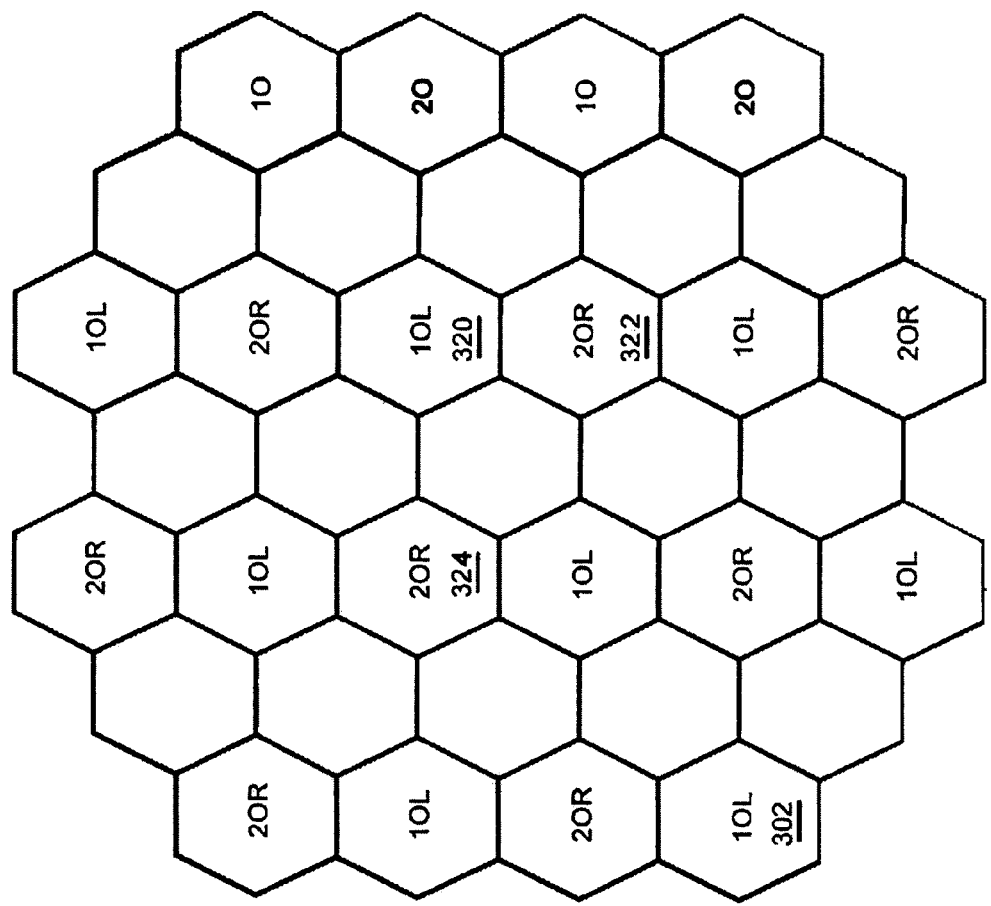
FIG. 5 depicts the odd hop downlink beams from the beam laydown of FIG. 3.

FIG. 4 shows the laydown 300 as well. In FIG. 4, however, only the even hop locations are marked. Similarly, FIG. 5 shows the beam laydown 300 with only the odd hop locations marked.

Figure 6:
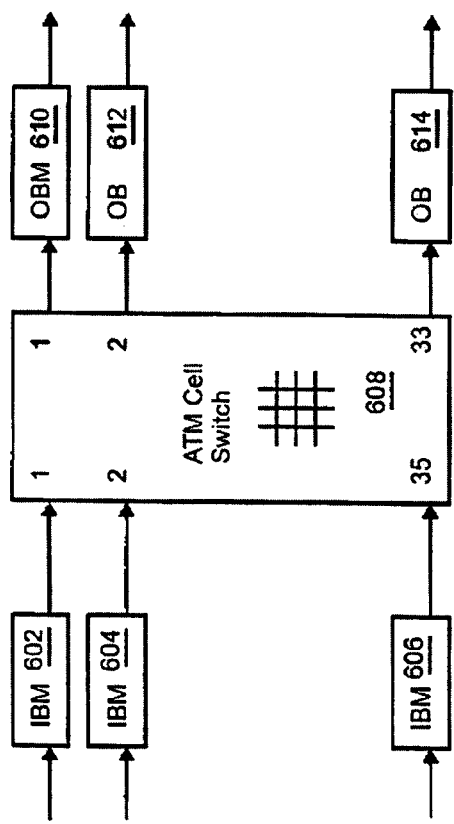
FIG. 6 shows an implementation of a router.

Turning next to FIG. 6, a preferred implementation of a router 600 is illustrated. The router 600 includes thirty-five inbound modules (IBMs), three of which are designated 602, 604, 606. The IBMs 602–606 are coupled to input ports of an ATM cell switch 608. The ATM cell switch 608 has thirty-three outputs coupled to individual outbound modules (OBMs), three of which are designated 610, 612, 614. pairs of uplink demodulators feed each IBM 602–606, while the OBMs 610–614 feed downlink modulators.

The router 600 provides a self addressed packet switching function. In other words, the router 600 uses addressing or destination information present in uplink data (e.g., ATM cells) to deliver the cells to a specific data queue that feeds a downlink beam appropriate for the destination or next hop of the cell. Thus, for example, the VPI/VCI fields in an ATM cell may be used to guide the cell into an appropriate downlink queue. Cells may first be discarded however, if they fail their header error check.

The output of the IBMs 602–606 includes a routing tag, a queue tag, and the (possibly modified) cell itself. The role of the IBMs 602–606, the routing tag and, the queue tag will be described in more detail below with respect to FIG. 7. In general, the ATM cell switch 608 uses the bits in the routing tag to connect a cell switch input port to a cell switch output port. The queue tag, a portion of the routing tag, and the cell itself then flow through the switch to the OBM connected to the selected output port. As will be described in more detail below, each OBM 610–614 includes a set of downlink queues that feed downlink beams directed to predetermined terrestrial cells. The queue tag determines in which downlink queue the cell will be inserted in the OBM (and may be indicative of cell priority and downlink coding rate). Thus, the IBMs 602–606, the ATM cell switch 608, and the OBMs 610–614 operate in concert to deliver cells to an appropriate downlink queue in a self addressed manner.

Figure 7:
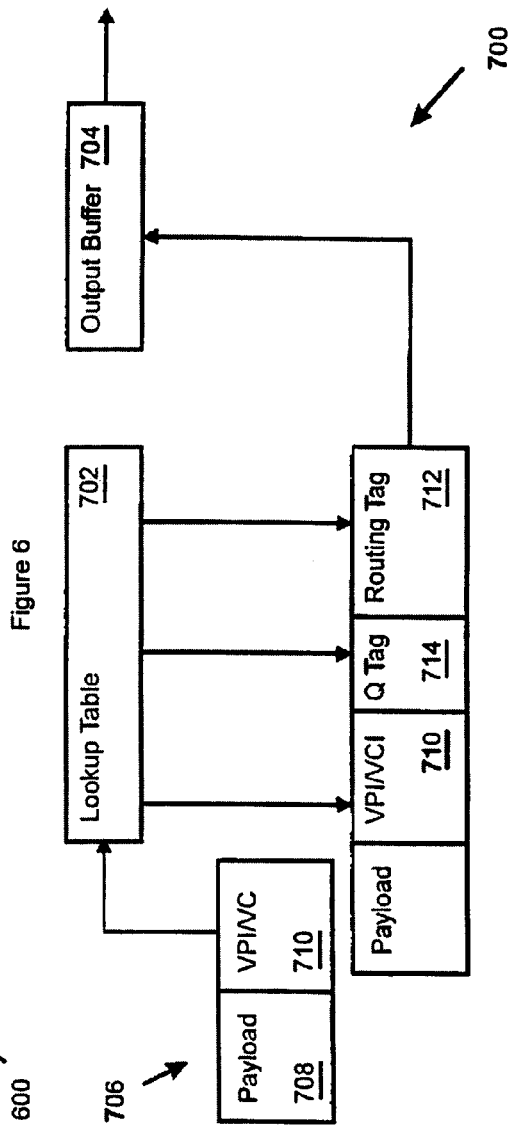
FIG. 7 shows an implementation of an inbound module.

FIG. 7 illustrates an implementation 700 of the IBMs 602–606. In particular, the implementation 700 includes a lookup or routing table 702 and an output buffer 704. An incoming ATM cell generally indicated at 706 is shown to include (among other fields) a payload 708 and a VPI/VCI address 710. FIG. 7 also illustrates a particular routing tag 712, queue tag 714, and optional replacement VPI/VCI 716 field for the cell from among those stored in the routing table 702. If the cell is modified (e.g., by changing its VPI/VCI), the IBM will also recompute the cell header error check. A ground based Network Control Center (NCC) may dynamically update the routing table 702 to ensure proper routing of cells from the current network node (e.g., the satellite) to the next network node (e.g., a ground terminal).

The VPI/VCI 710 of the cell 706 addresses the routing table 702. In response, the routing table 702 provides the routing tag 712, queue tag 714, and new VPI/VCI addresses 716 (e.g., for the next hop that the cell will make). A NULL entry in the routing table 702 may indicate that the cell is to be discarded. Any modifications to the uplink cell result in the IBM recomputing an error check for the uplink cell as well. This information enters the output buffer 704 (which may be, for example, 8191 cells in length). Once in the output buffer 704, the information awaits selection by an arbitration algorithm before it enters the cell switch 608. As examples, the arbitration algorithm may give preference to the oldest cells (e.g., using a two bit quantization of clock cycle cell age), the remaining capacity of the output buffer 704 (e.g., using a three bit quantization of total input queue size), and the like.

Once the cell is selected, its routing tag is used to send the cell to an associated output port of the cell switch 608. In particular, the routing tag 712 is preferably seven bits in length. The ATM cell switch 608 uses six of the seven bits internally to connect an input port to an output port determined by the six bits. For future expandability, the seventh bit may be used, for example, to support larger switches with additional output ports.

Figure 8:
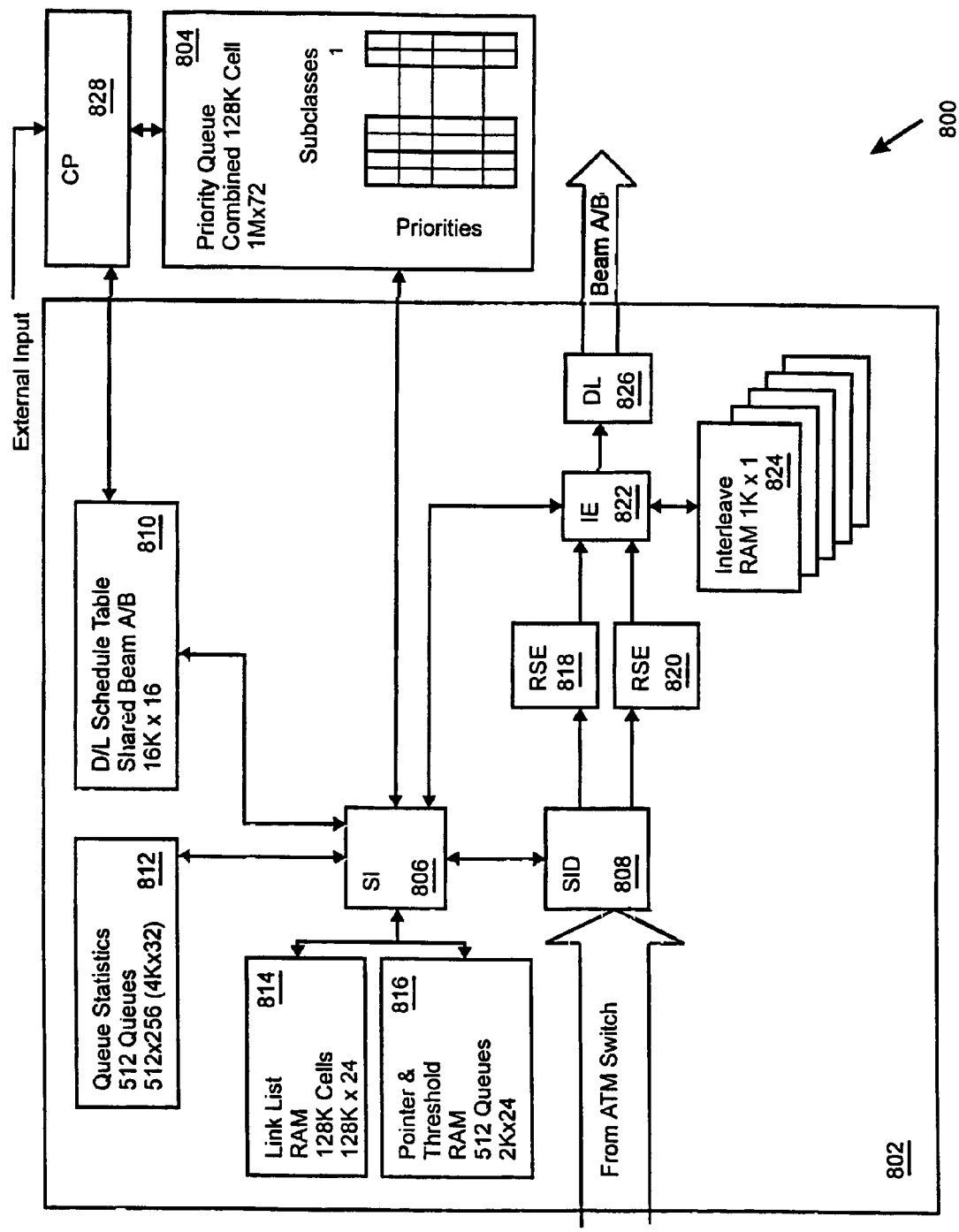
FIG. 8 illustrates an implementation of an outbound module.

Turning now to FIG. 8, that figure illustrates an implementation of an OBM 800. The OBM 800 includes an OBM controller 802 coupled to an external cell memory 804. The OBM controller 802 integrates, preferably, into a single ASIC logic that implements a switch interface controller (SIC) 806 and a switch interface data handler (SID) 808. The SIC 806 couples to a downlink schedule table 810, a queue statistics memory 812, a linked list memory 814, and a pointer memory 816. In addition, the OBM 800 includes a first Reed-Solomon encoder (RSE) 818, a second RSE 820, interface electronics (IEA) 822 coupled to interleaving memory 824, and a downlink frame formatter (DLF) 826.

The external cell memory 804 is preferably organized into numerous queues. The queues may be distinguished by characteristics such as hop location, priority, and code rate, or other criteria. In general, for each hop location, there may be one or more code rates, each having one or more priority queues. In one embodiment, there are 16 downlink hop locations (referred to as a subclass) the external cell memory 804 includes 16 light coding queues and 16 heavy coding queues (i.e., 512 total queues). Each of the 16 light and 16 heavy coding queues represents a predetermined priority. One queue (e.g., priority 15, subclass 15, light coding) may be reserved for system controller traffic. The queue tag determines the subclass and the queue for which a cell is destined. The external cell memory 804 is preferably a multiport memory shared between output ports of the cell switch 608. The multiport nature of the external cell memory 804 resides in its role as shared storage for multiple hop locations (i.e., Beam A and Beam B that share a single physical cell switch 608 output port) served by the single OBM controller 802.

The memory provided by the external cell memory 804 may be allocated in a fixed or dynamic manner in several different ways. As one example, one or more queues may be allocated a fixed amount of memory to meet the expected long term needs of the subclass and priority associated with the queue. The remaining memory may then be shared by the remaining queues. To guarantee a minimum bandwidth for each queue, a minimum threshold amount of memory may be reserved for each queue. Thus, the external cell memory 804 permits pairing destination bandwidth needs for a particular destination at a particular time with allocations of queue memory. To that end, the NCC may dynamically uplink to the satellite changes to the manner in which memory is allocated. The thresholds, maximum queue size, minimum queue size, and the like are stored in the pointer memory 816.

The SIC 806 comprises logic that directs the activities of the OBM controller 802, including obtaining cells from the cell switch 608 through the SID 808. As will be described in more detail below, the SIC 806 makes a determination regarding whether the cell should be accepted or rejected using parameters for each queue stored in the pointer memory 816. If a cell is accepted, the SID 808 stores the cell in a queue in the external cell memory 804. The SIC 806 then updates the linked list memory 814 to record where the cell was stored in the external cell memory 804. The SIC 806 also updates the queue statistics memory 812 to reflect the number of cells in each queue in the external memory 804, the number of cells accepted or rejected for each queue, peak queue occupancies, the number of cells pulled from the each queue for transmission, and the number of threshold failure cells.

The SIC 806 and SID 808 handle retrieval of cells from the external cell memory 804 under in accordance with a schedule stored in the downlink schedule table 810. In particular, the downlink schedule table specifies for each frame parameters such as code selection, power gating, cell selection, and the like.

The structure of the downlink schedule table is described in detail in Ser. No. 09/599,150, and is incorporated herein be reference in its entirety.

The RSEs 818 and 820 apply a Reed-Solomon block code (e.g., a (236, 212) block code) to cells retrieved for transmission. The IEA 822 subsequently interleaves, scrambles, and convolutionally codes the block coded cells. To that end, for example, the convolutional code may be a 3/4 rate constraint length 7 punctured convolutional code for light coded cells, and a 3/8 rate constraint length 7 punctured convolutional code for heavy coded cells. The DLF 826 then forms, preferably, a two payload downlink frame for the downlink, including overhead information (e.g., synchronization codes, code identifiers, guard time, and the like). Each payload may independently carry 12 heavy coded cells or 24 light coded cells.

Additional details of the frame format, coding, interleaving, and scrambling may be found in Ser. No. 09/599,040 filed Jun. 21, 2000, and is incorporated herein be reference in its entirety.

Figure 9:
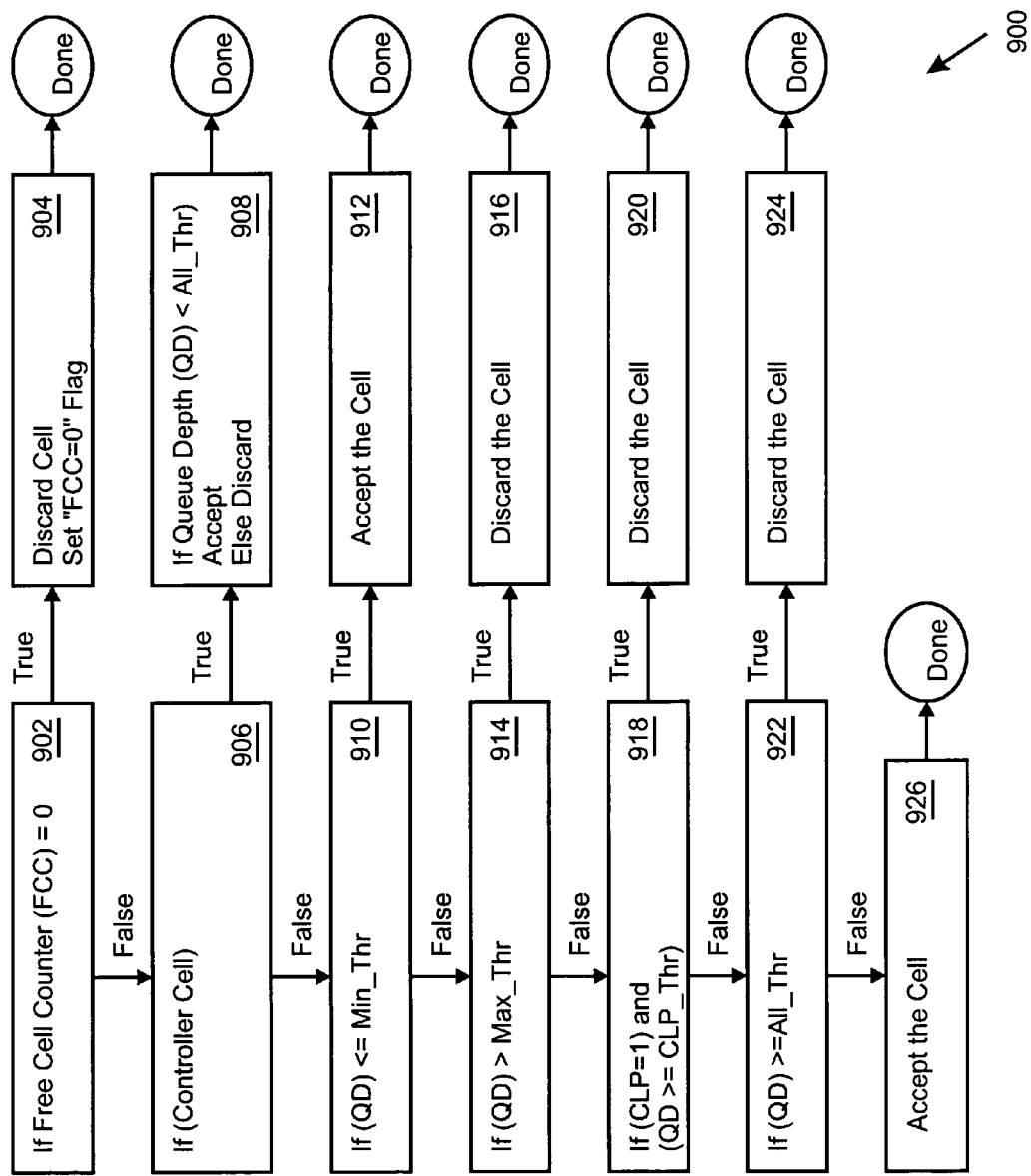
FIG. 9 shows a cell discard algorithm for fixed partition buffers.

As noted above, the SIC 806 makes a determination regarding whether a cell retrieved from the cell switch 608 should be accepted or rejected using parameters for each queue stored in the pointer memory 816. Turning now to FIG. 9, a flow diagram 900 presents a series of determinations made by the SIC 806 when queue are fixed in size. At step 902, the SIC 806 determines whether there is any free memory in which to store the cell. If the free cell counter (FCC, i.e., the total buffer size minus the number of queued cells) is zero, the cell is discarded (step 904). Otherwise the SIC 806 determines if the cell is a controller cell (step 906). A controller cell, for example, may be a cell that carries command, configuration, or status information from the NCC to the satellite (e.g., to update the routing table 702 or downlink scheduling table). If the cell is a controller cell, and if the associated queue depth (QD) is less than its maximum size (i.e., the All_Thr), then the cell is accepted, otherwise it is discarded (step 908).

Continuing at step 910, if the queue depth is less than or equal to the minimum threshold queue size (Min_Thr) then the cell is accepted (step 912). Step 914 checks to see if the queue depth is greater than the maximum allowed queue size (Max_Thr), and if so the cell is discarded (step 916). Beginning at step 918 the SIC 806 may accept or discard the cell based on the Cell Loss Priority (CLP) field found, for example, in an ATM Cell.

A CLP of zero indicates that the cell is of high priority and should not be dropped during periods of high congestion. A CLP of one indicates that the cell is of low priority and should be dropped, if needed, during periods of high congestion. At step 918, if the cell is low priority, and the queue depth is greater than the cell loss priority threshold (CLP_Thr), then the cell is discarded (step 920). If (step 922) the queue depth is greater than All_Thr, then the cell is discarded (step 924). Otherwise, the cell is accepted (step 926).

Figure 10:
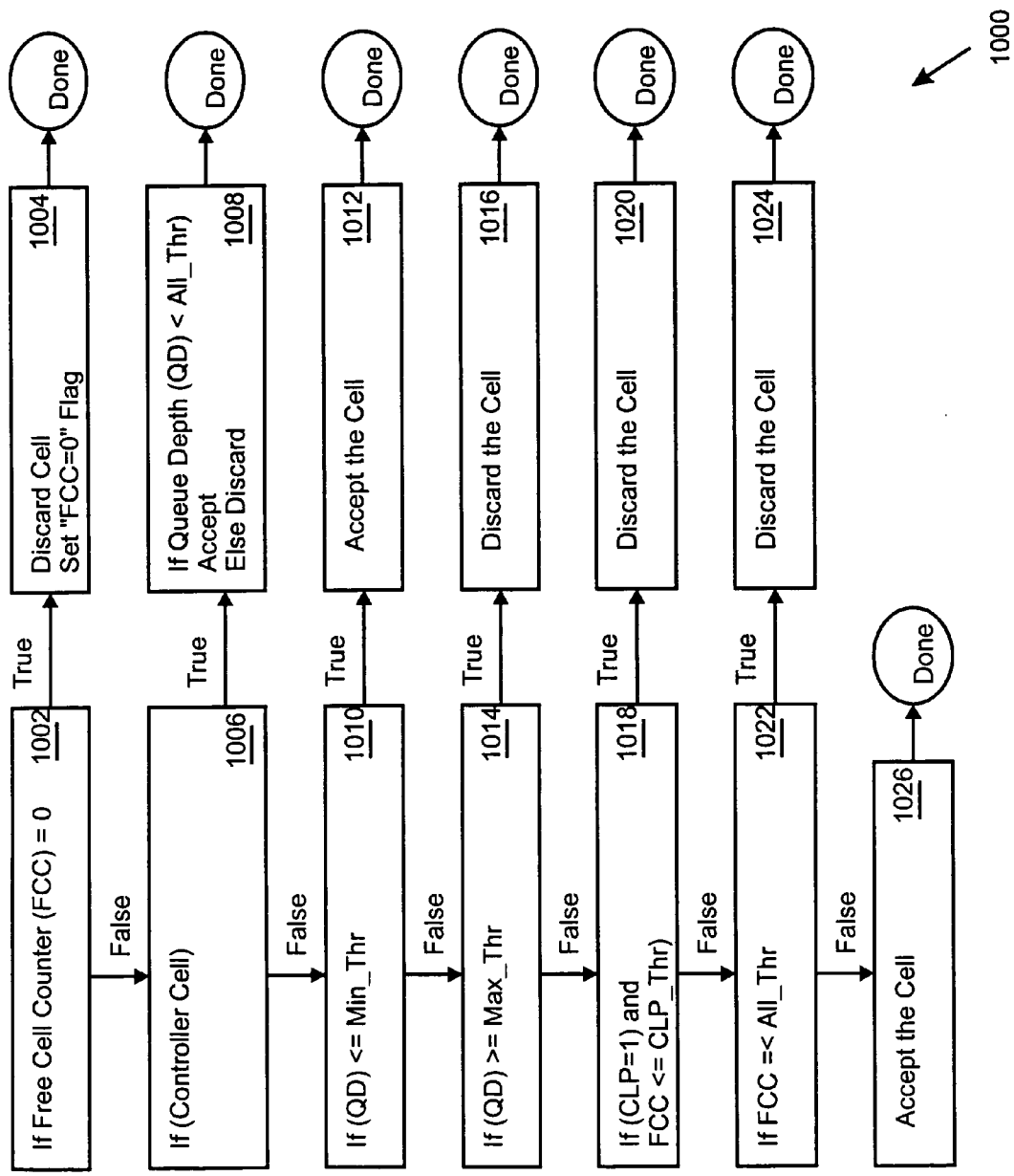
FIG. 10 shows a cell discard algorithm for dynamically buffered queues.

When queues are allocated memory in a dynamic fashion, the SIC 806 follows the steps indicated in FIG. 10 to determine whether a cell is to be accepted. In particular, at step 1002, the SIC 806 determines whether there is any free memory available to store the cell. If the free cell counter (FCC) is zero, the cell is discarded (step 1004). Otherwise the SIC 806 determines if the cell is a controller cell (step 1006). If so, if the queue depth (QD) is less than All_Thr, then the cell is accepted, otherwise discarded (step 1008).

Continuing at step 1010, if the queue depth is less than or equal to the minimum threshold queue size (Min_Thr) then the cell is accepted (step 1012). Step 1014 checks to see if the queue depth is greater than the maximum allowed queue size (Max_Thr), and if so the cell is discarded (step 1016). At step 1018 the SIC 806 may accept or discard the cell based on the CLP. If the cell is low priority, and the amount of free memory is less than or equal to the cell loss priority threshold (CLP_Thr), then the cell is discarded (step 1020). If (step 1022) the amount of free memory is less than All_Thr, then the cell is discarded (step 1024). Otherwise, the cell is accepted (step 1026).

The pointer memory 816 stores the thresholds referred to above, including the All_Thr, Min_Thr, Max_Thr, CLP_Thr, and FCC for each queue.

Returning again to the external cell memory 804, its shared nature allows a queue to grow in size to handle bursts of traffic. In addition, dynamic buffers allow the NCC to accept connections whenever shared memory is available to allow a queue to grow. On the other hand, a fixed partition buffer must be checked to determine if it has any room left for cells generated by the new connection. Bandwidth available only at a different priority level nevertheless denies the connection. The shared memory approach, however, allows the appropriate priority level queue to grow in size to handle the connection. Network and queue management functions therefore tend to be less complex and more efficient.

It is also noted that the external cell memory 804 may also include a queue dedicated to controller cells. The downlink scheduling table services the controller cells by placing them in a controller buffer (as opposed to preparing them for transmission in a downlink frame), for example, 32 or 64 cells in size. One or more control elements may then access the controller buffer, decode commands in the cell, and perform those commands. As an example, a controller cell may direct an inbound module to replace entries in the routing table 702.

Figure 11:
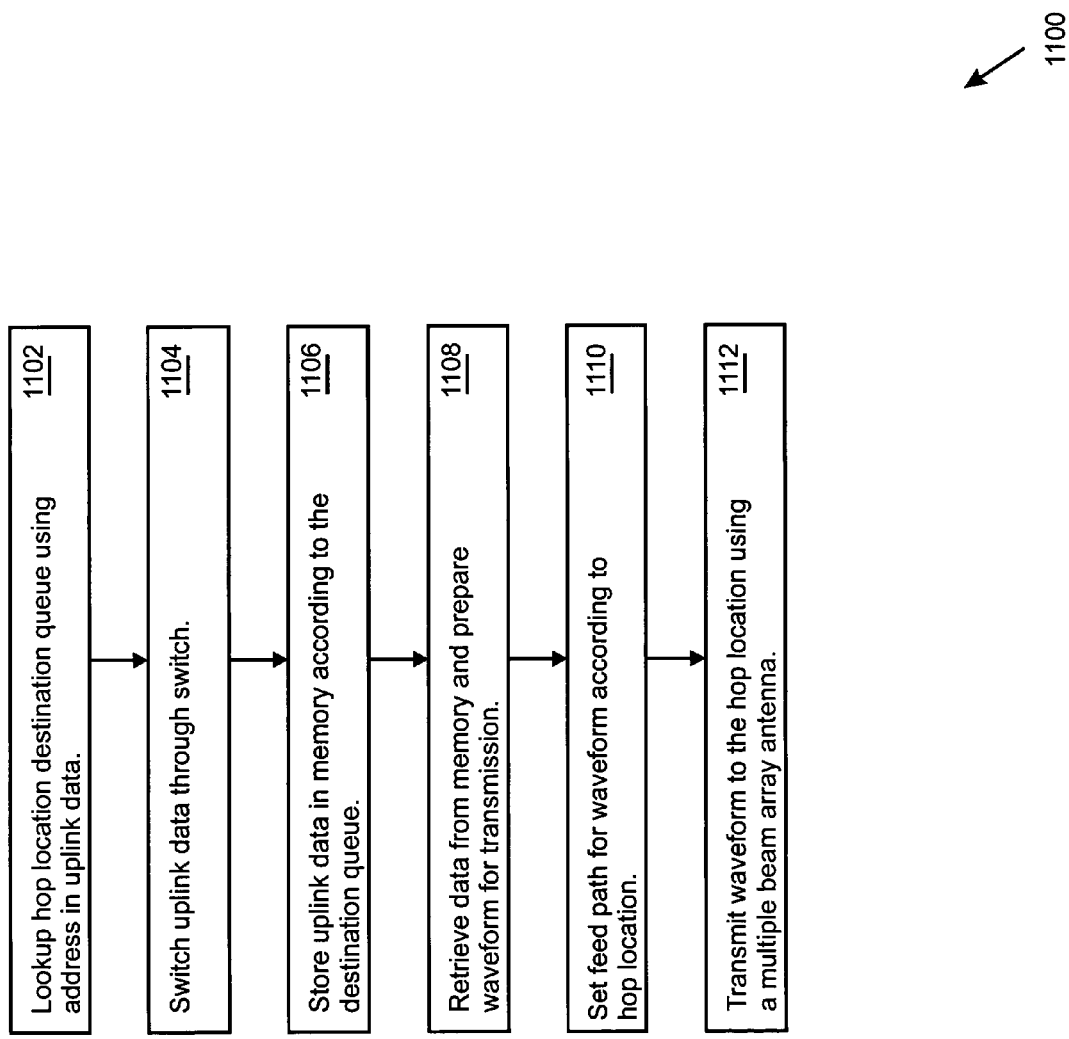
FIG. 11 illustrates a method for routing data through a satellite to a selected downlink hop location.

FIG. 11 summarizes a method 1100 for routing data through a satellite to a selected downlink hop location. At step 1102, the satellite looks up a hop location destination queue using an address carried in the uplink data. Next, at step 1104, the satellite switches the uplink data through a switch, and stores (step 1106) the data in the appropriate queue.

In building frames for transmission, the satellite, at step 1108, first retrieves data from the queue in order to build the downlink waveform. The satellite then selects a feed path for the waveform according to its destination hop location (step 1110). The waveform is transmitted (step 1112), preferably using a multiple beam array antenna with feed elements assigned to the hop locations.

Figure 12:
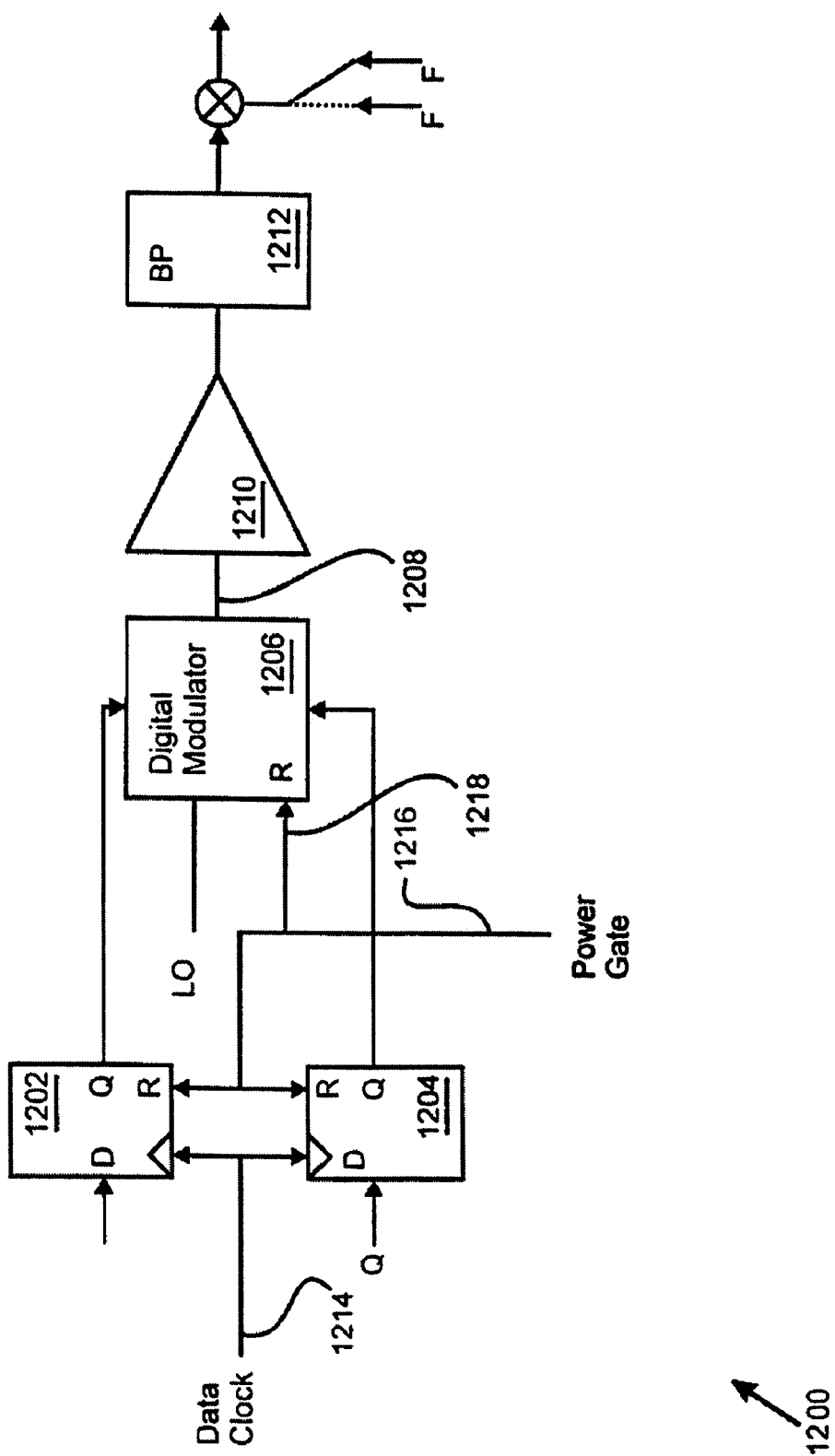
FIG. 12 shows a modulator implementation that supports power gating.

As noted above, the downlink beam may be power gated in a number of ways to save power, or to achieve other goals. Turning next to FIG. 12, that figure shows an implementation 1200 of the modulator 206 that supports power gating. Inphase data is supplied to the Inphase gate 1202 while Quadrature data is supplied to the Quadrature gate 1204. As illustrated, the Inphase and Quadrature gates 1202, 1204 are D flip flops with reset inputs. The Inphase and Quadrature gates 1202, 1204 feed a digital modulator core 1206 that produces a modulated waveform on a modulator output 1208. A local oscillator (LO) signal (preferably 750 MHz) provides an intermediate frequency carrier signal. The amplifier 1210 boosts the modulated waveform, after which it is filtered by the bandpass filter 1212. The bandpass filter 1212 preferably has a passband centered at 750 MHz, for example, from 625 to 875 MHz.

A data clock 1214 that preferably runs at 196.7 MHz drives the Inphase and Quadrature gates 1202, 1204. Note that a power gate input 1216 connects to the Inphase and Quadrature gates 1202, 1204, as well as to the gating control input 1218 of the digital modulator core 1206. When an active power gating signal is present on the power gate input 1216, the Inphase and Quadrature gates 1202, 1204 have their outputs held in a known state (e.g., both 0). Furthermore, the digital modulator core 1206 outputs a signal with frequency content outside of the passband of the bandpass filter 1212.

For example, the digital modulator core 1206 may output a DC signal in response to the active power gating signal. As a result, the bandpass filter eliminates the DC signal. A power gated signal results.

Returning to FIG. 2, the upconverter 208 (e.g, a 20 GHz mixer) ordinarily outputs a fully upconverted signal for amplification and transmission. However, the absence of energy in the power gated signal causes the upconverter to produce substantially no signal at its output during power gating. As a result, the TWTA 210 does not expend amplification energy, and substantially no downlink energy is present in the downlink beam while the power gating signal is active. In other words, the DC power consumption of the TWTA 210 is reduced by substantially eliminating radiated power.

Figure 13:
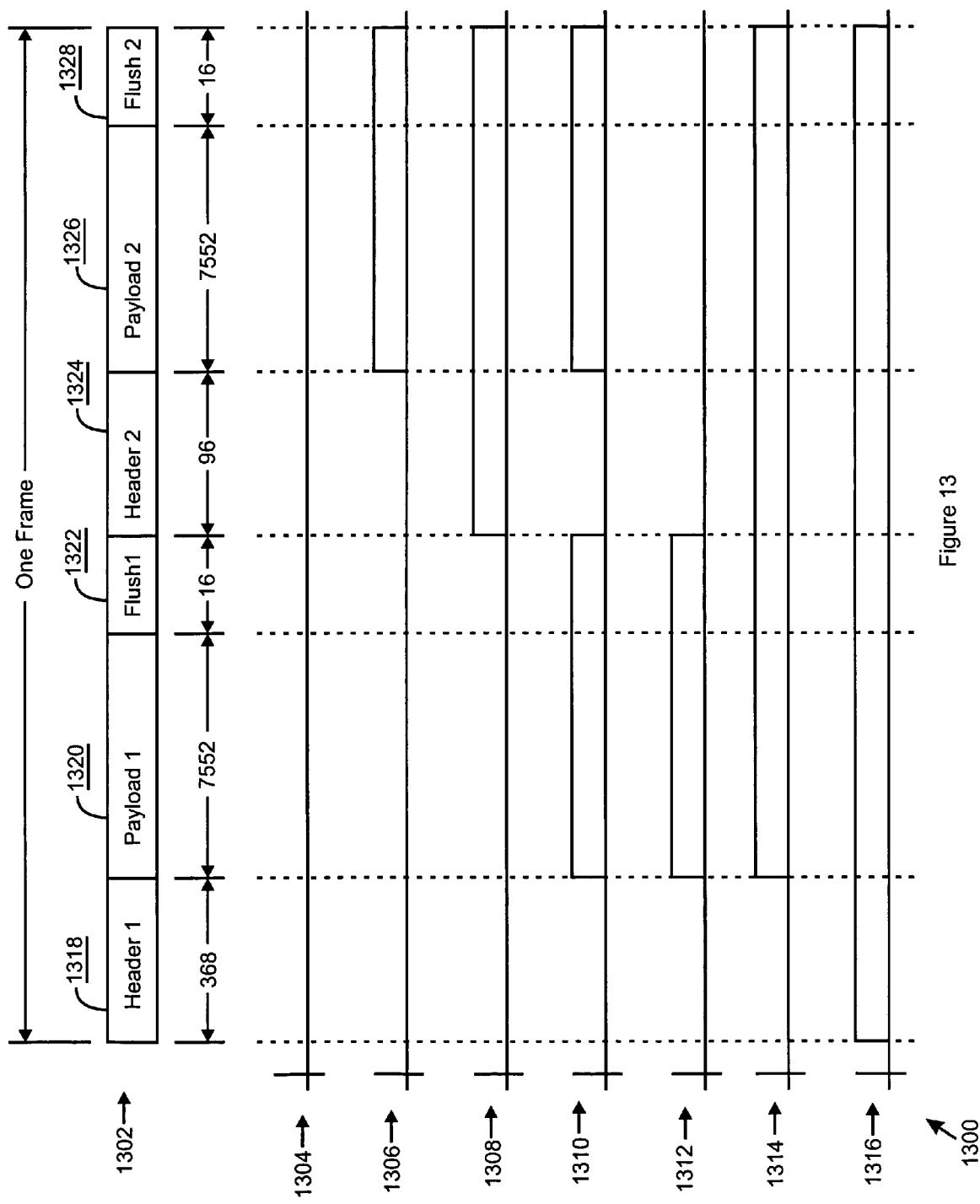
FIG. 13 shows a multiple payload frame signal with exemplary power gating control signals.

Turning next to FIG. 13, that figure present a timing diagram 1300 that illustrates a multiple payload frame signal 1302 and power gating signals 1304, 1306, 1308, 1310, 1312, 1314, 1316 (assumed active when high). As an example, the frame signal 1302 may include a 368 symbol first header signal 1318, a 7552 symbol first payload signal 1320, a first 16 symbol flush signal 1322, a 96 symbol second header signal 1324, a 7552 symbol second payload signal 1326, and a second 16 symbol flush signal 1328. In general, however, the frame signal 1302 may include N headers and N payloads independently subject to power gating.

The power gating signal 1304 never goes active during the frame signal 1302. Thus, none of the frame signals 1318–1328 are power gated. As a result, both first and second header signals 1318, 1324 and both first and second payload signals 1320, 1326 are delivered to the ground. In contrast note that the power gating signal 1316 is active across the entire frame signal 1302. Thus, substantially no energy is provided in the downlink beam over the time during which the frame signal 1302 would be transmitted.

On the other hand, the power gating signal 1306 goes active during the second payload signal 1326 and the second flush signal 1328. Thus, the frame signal 1302 continues to bear important overhead information in the first and second header signals 1318, 1324. The overhead information may include, for example, synchronization bits, beam hopping location identifiers, frame coding identifiers, frame counts, and the like.

The overhead information may further include power gating bit patterns that indicate to a ground receiver which frame signals are power gated. As an example, the first header signal 1318 or second header signal 1324 may include a frame type field that carries repetitions of the bit pattern 10100101 to indicate power gating of the first payload signal 1320 or second payload signal 1326, or repetitions of the bit pattern 11110000 to indicate power gating of the entire frame signal 1302. In particular, bit patterns may be assigned to identify any combination of header, payload, and flush signal power gating. Note also that a ground receiver may deactivate its own receivers in response to the bit patterns to save power during power gated sections of the frame signal.

Still with reference to FIG. 13, the power gating signal 1310 results in power gating of the first and second payload and flush signals 1320, 1322, 1326, 1328. Similarly, the power gating signal 1312 results in power gating of the first payload signal 1320 and the first flush signal 1322.

Because the multiple payload frame signal 1302 includes multiple headers, each preferably bearing synchronization information, additional power gating options are available. Thus, for example, the power gating signal 1308 power gates the second header signal 1324, second payload signal 1326, and the second flush symbols 1328. Synchronization is nevertheless provided by the first header signal 1318. Similarly, the power gating signal 1314 power gates all the frame signals except for the first header signal 1318.

The scheduler 202 may include logic to assert the power gating signal under many scenarios. For example, when the satellite moves into eclipse and less power is available, the scheduler 202 may power gate every Nth complete frame, every other payload, or any combination of frame signals to achieve a desired power reduction. As another example, the scheduler 202 may activate the power gating signal in response to a statistical multiplexing estimate of downlink beam utilization. As an example, if the downlink beam is estimated to be 90% utilized during a certain time period, then the scheduler 202 may power gate 1–10% of the frames or payloads. Such estimates may be uplinked to the satellite or generated onboard.

As another example, the scheduler 202 may determine when to activate power gating based on the current terrestrial cell hop location of the downlink beam. Thus, scheduler 202 may power gate the second payload signal 1326 if the bandwidth requirements of the current terrestrial cell are met by the first payload signal 1320 alone. As yet another example, the scheduler 202 may power gate based on data queues present in the router 204. For example, a data queue from which ATM data cells are extracted to fill the second payload signal 1326 may consistently have too few cells to completely fill the second payload signal 1326. In response, the scheduler 202 may power gate the second payload signal 1326 periodically in order to maintain the data queue approximately at a preselected occupancy level, on average.

Yet another example of conditions that give rise to power gating include lack of cells in the data queues. For example, if there are no cells in the data queues that feed a downlink beam, then the downlink frame may be power gated until cells are available. In addition, if too few cells are available to fill the first payload, then the first payload may be power gated. Similarly, if too few cells are available to fill the second payload, then the second payload may be power gated. Alternatively, the entire frame may be power gated until enough cells are available to fill both payloads of a frame. To this end, power gating thresholds set by the NCC may be uplinked to the satellite. The power gating thresholds indicate how many cells need be available for each payload, or the frame in general, before the payload is transmitted without power gating. The remaining space in the payload may then be filled, for example, with NULL cells or other placeholder data.

Figure 14:
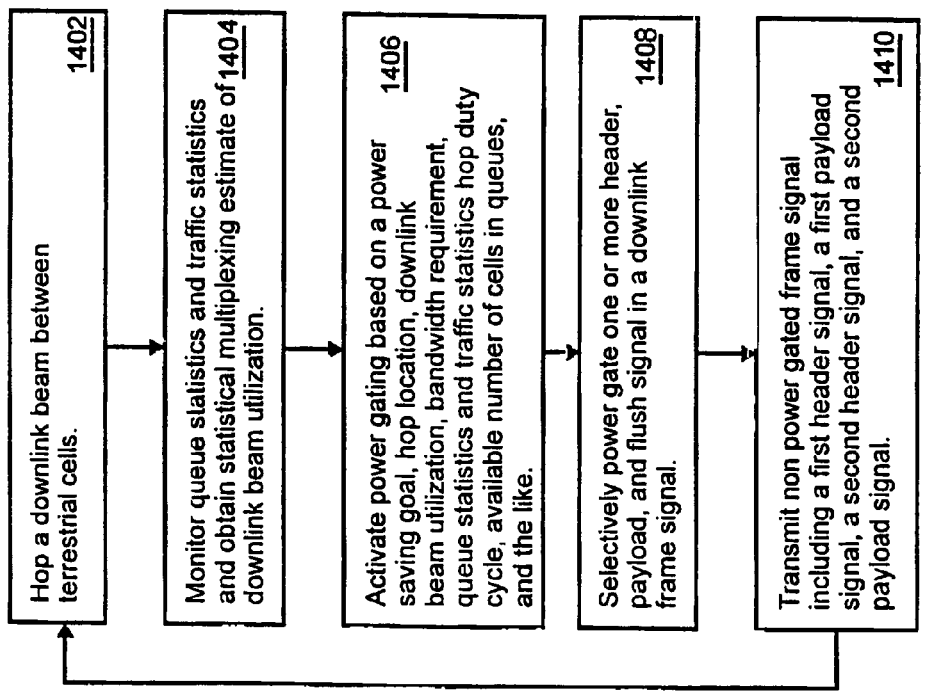
FIG. 14 illustrates operational steps that occur before and after power gating a beam hopping multiple payload frame signal.

Turning next to FIG. 14, that figure shows a flow diagram 1400 of the operational steps that occur before and after power gating. The operational steps include hopping a downlink beam between at least two terrestrial cells (step 1402). At step 1404, queue depths are monitored and statistical multiplexing estimates of downlink utilization are obtained. At step 1406, power gating is activated based on, as examples, beam hop locations, power saving goals, queue depths, the number of cells available in the queues, and the like, as discussed in detail above.

Continuing at step 1408, one or more header signals, payload signals, and flush signals are power gated. Thus, at step 1410, a frame signal is transmitted in which at least one header signal, payload signal, or flush signal has substantially no energy in the downlink beam.

Figure 15:
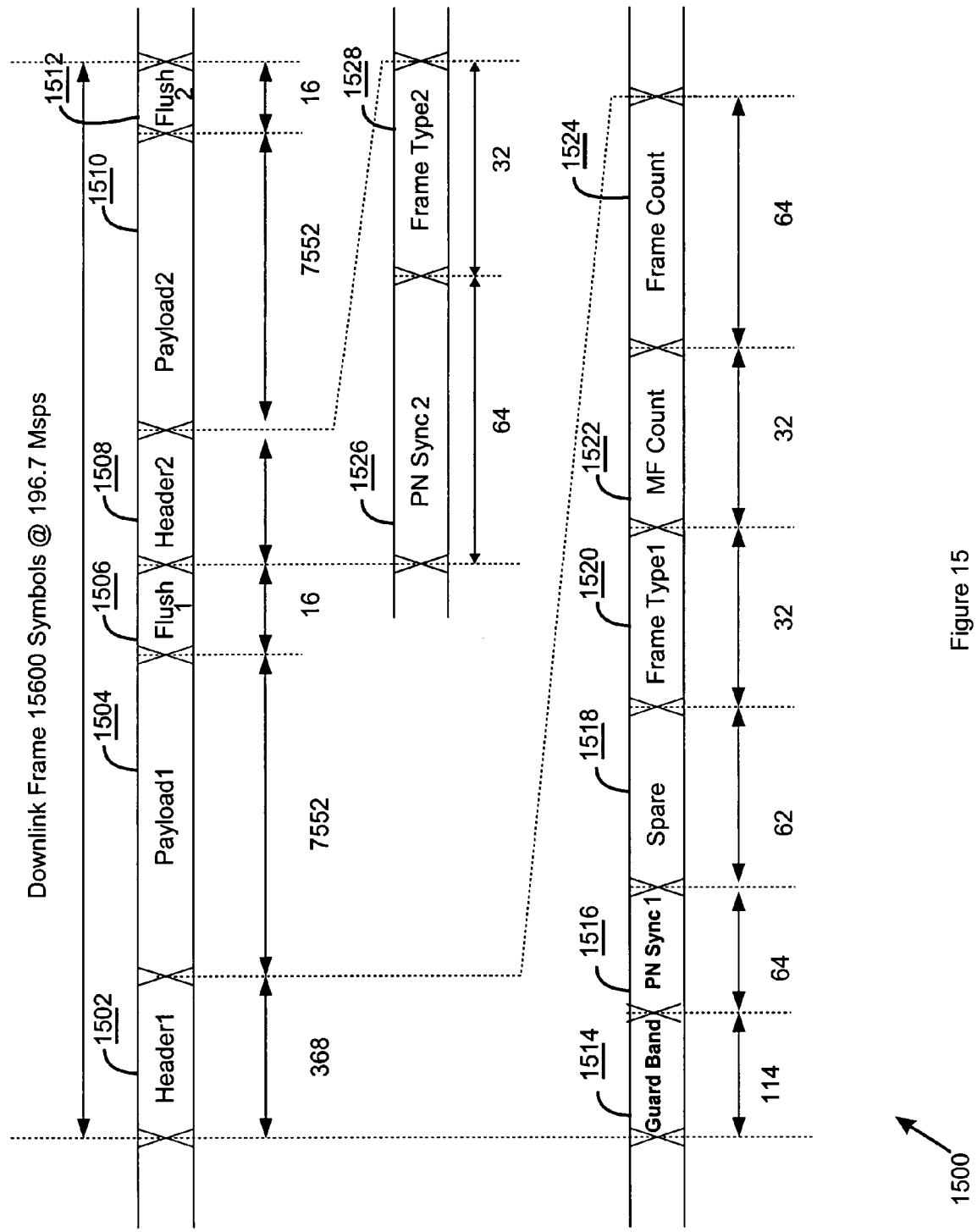
FIG. 15 shows a preferred embodiment of a downlink frame suitable for power gating.

FIG. 15 shows a preferred embodiment of a downlink frame signal 1500 suitable for power gating as discussed above. The frame signal 1500 includes a first header field 1502 followed by a first payload field 1504 and a first flush field 1506. In addition, the frame signal 1500 includes a second header field 1508 followed by a second payload field 1510 and another flush field 1512. The first header field 1502, first payload field 1504, first flush field 1506, second header field 1508, second payload field 1510, and second flush field 1512 are all encapsulated into the single frame 1500.

Continuing with reference to FIG. 15, the first header field 1502 is composed of several subfields. In particular, the first header field 1502 includes a hopping beam guard band 1514, a first payload pseudorandom noise (PN) synchronization field 1516, and a spare field 1518. The first header field 1502 also includes a first frame type field 1520, a masterframe count field 1522, and a subframe count field 1524.

The second header section includes a smaller set of subfields, namely, the second PN synchronization field 1526 and the second frame type field 1528.

Table 1, below, shows the preferred length and modulation of each field. Symbols are preferably transmitted at 196.7 megasymbols per second.

TABLE 1

| Field | Symbols | Modulation |
| --- | --- | --- |
| first header 1502 | 368 | |
| hopping beam guard band 1514 | 114 | BPSK |
| first payload PN synch 1516 | 64 | BPSK |

TABLE 1-continued

| Field | Symbols | Modulation |
| --- | --- | --- |
| spare 1518 | 62 | BPSK |
| first frame type 1520 | 32 | BPSK |
| masterframe count 1522 | 32 | BPSK |
| subframe count 1524 | 64 | BPSK |
| first payload 1504 | 7552 | QPSK |
| first flush 1506 | 16 | QPSK |
| second header 1508 | 96 | |
| second payload PN synch 1526 | 64 | BPSK |
| second frame type 1528 | 32 | BPSK |
| second payload 1510 | 7552 | QPSK |
| second flush 1512 | 16 | QPSK |
| TOTAL LENGTH | 15600 | |

The hopping beam guard band 1514 provides, in the preferred embodiment, approximately 580 ns of guard time. In general, however, the length of the hopping beam guard band 1514 is selected to encompasses an expected circuit switching downlink beam hopping delay. The downlink beam hopping delay represents a worst case estimate of the amount of time that the satellite needs to redirect a downlink beam (i.e., "hop" the beam) to a different geographic area.

The first PN synchronization field 1516 and the second PN synchronization field provide synchronization bits for earth terminals. As will be explained in more detail below, a single PN synchronization sequence generator is used to provide an identical PN sequence for both PN synchronization fields 1516, 1526. The subframe count field 1524 counts individual frames as they are transmitted. Preferably, the subframe count field 1524 includes a 16 bit downlink frame count appended with 8 zeros and convolutionally encoded with a relatively heavy (e.g., 3/8 rate) code. The masterframe count field 1522 increments at the start of every masterframe (e.g., every 9328 frames). The masterframe count rolls over after reaching its maximum value (0xFFFFFFFF), although it may be reset or preprogrammed at any time.

The spare field 1518 may be drawn from to provide subsequent enhancements to the frame 1500 (e.g., additional synchronization bits). Preferably, the spare field 1518, the hopping beam guard band 1514, and first PN synchronization field 1516 are filled with PN bits that are generated by a PN synchronization sequence generator discussed below.

The first frame type field 1520 generally indicates characteristics of the first payload field 1504, while the second frame type field 1528 generally indicates characteristics of the second payload field 1510. Several examples of codes for the first and second frame type fields 1520, 1528 are illustrated below in Table 2.

TABLE 2

| Frame Type | Uncoded Value | Coded Value |
| --- | --- | --- |
| Light Coding | 110 | 00111100 |
| Heavy Coding | 011 | 10010110 |
| Frame Gate | 001 | 10100101 |
| Power Gate | 000 | 11110000 | where the coded values may result from the application of an (8, 4) Reed-Muller block code.

Although the light coding, heavy coding, and power gating options are with reference to a payload itself, the frame gate option indicates power gating of an entire frame (i.e., all 15600 symbols). Each coded value is preferably repeated four times in the frame type field. For example, a frame type of 00111100 00111100 00111100 00111100 in the first frame type field 1520 indicates that the first payload field 1504 is lightly coded. As another example, a frame type of 11110000 11110000 11110000 11110000 in the second frame type field 1528 indicates that the second payload field 1510 will be power gated. When a frame or payload field is power gated, only a small fraction of the ordinary output power will be generated in the downlink beam during the entire frame, or during the identified payload(s).

With regard to the heavy coding and light coding, as examples, a lightly coded payload may indicate 3/4 rate, constraint length 7, punctured convolutional coding of 1416 Reed-Solomon block coded bytes. A heavily coded payload may indicate a 3/8 rate, constraint length 7, punctured convolutional coding of 708 Reed-Solomon block coded bytes. Thus, the first and second payload fields remain the same size (7552 symbols) under both coding rates.

The first and second payload fields 1504, 1510 carry the billable data to the earth terminals. The first and second payload fields 1504, 1510 are typically concatenated coded using an inner convolutional code. The, the first and second flush fields 1506, 1512 are provided as a convenient way for the earth terminal convolutional decoders to reset their state in preparation for the next payload.

The frame signal 1500 delivers multiple payloads (in the preferred embodiment, two payloads) in a single frame. Although a first header field 1502 is provided as well as a second header field 1508, the second header field 1508 is smaller than the first header field 1502. In particular, the second header field does not repeat the hopping beam guard band 1514 (since the receiver(s) for the first and second payload fields 1504, 1510 are in the same beam spot for the current hop location), spare field 1518, masterframe count 1522 and subframe count 1524 (since only one count is needed for the single multiple payload frame).

As a result, the frame 1500 delivers two payloads in a single frame with less overhead than would be incurred by transmitting two single payload frames. Throughput is therefore higher. The specific frame 1500 shown in FIG. 1 may be generalized to a single N payload N header frame, under the general condition that the sum of the overhead arising from the N headers is less than the sum of the overhead arising from N individual single payload frames.

Thus, the present invention provides a beam hopping self addressed packet switched communication system with power gating. In particular, the communication system reduces power consumption through power gating downlink beam frames in several situations. As examples, the communication system may power gate when there is no data to send in the downlink beam, where there is not enough data to build a complete payload, or when there is not enough data to build a complete frame. As additional examples, the communication system may power gate to achieve a desired average queue depth, or according to a statistical multiplexing estimate of downlink utilization.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A downlink beam frame signal processing system for a communication satellite, the processing system comprising:
    a packet switch routing self addressed uplink data to a memory, the memory comprising at least a first and a second downlink beam hop location storage;
    a power amplifier for amplifying a waveform based in part on the uplink data for transmission; and
    a power gating circuit coupled to the power amplifier and including a power gate input responsive to a power gating signal to remove RF power from at least a portion of the waveform, thereby reducing DC power consumption of the power amplifier.

2. The processing system of claim 1, wherein the power gating signal is indicative of unavailability of uplink data in the memory.

3. The processing system of claim 2, wherein unavailability of uplink data comprises too little uplink data to fill a payload field in the waveform.

4. The processing system of claim 2, wherein unavailability of uplink data comprises the absence of uplink data in the memory.

5. The processing system of claim 2, wherein unavailability of uplink data comprises too little uplink data to fill at least two payload fields in the waveform.

6. The processing system of claim 2, wherein the power gating signal is indicative of a predetermined satellite power requirement.

7. The processing system of claim 6, wherein the power requirement comprises an eclipse power requirement.

8. The processing system of claim 2, wherein the power gating signal is indicative of a statistical multiplexed estimate of downlink utilization.

9. The processing system of claim 2, wherein the power gating signal is indicative of a desired average first hop location queue depth formed in the memory.

10. A method for processing a downlink beam frame signal, the method comprising:
    switching self addressed uplink data into at least one of a first and second downlink hop location storage area in a memory;
    amplifying a frame signal based in part on the uplink data for transmission; and
    prior to transmission, power gating at least a portion of the frame signal in response to a power gating signal.

11. The method of claim 10, wherein power gating comprises power gating at least a payload of the frame signal in response to too little uplink data in the memory to completely fill the payload in the frame signal.

12. The method of claim 10, wherein power gating comprises power gating at least a payload of the frame signal in response to too little uplink data in the memory to fill the payload in the frame signal beyond a predetermined threshold.

13. The method of claim 10, wherein power gating comprises power gating at least a payload of the frame signal in response to too little uplink data in the memory to completely fill at least two payload fields in the frame signal.

14. The method of claim 10, wherein power gating comprises power gating at Least a payload of the frame signal in response to satellite power requirements.

15. The method of claim 14, wherein power gating comprises power gating at least a payload of the frame signal in response to satellite eclipse power requirements.

16. The method of claim 10, wherein power gating comprises power gating at least a payload of the frame signal in response to a statistical multiplexed estimate of downlink utilization.

17. The processing system of claim 10, wherein power gating further comprises maintaining at least one synchronization field in the frame signal.

18. A downlink beam frame signal processing system for a communication satellite, the processing system comprising:
- a packet switch routing self addressed uplink data to a memory, the memory comprising at least first and a second downlink beam hop location storage; and
- a waveform generator coupled to the packet switch, the waveform generator comprising a modulator for producing a waveform to be transmitted and a power gating input for carrying a power gating signal for removing power from at least a portion of the waveform before transmission.

19. The processing system of claim 18, further comprising a filter coupled to a modulator output carrying the waveform.

20. The processing system of claim 19, wherein the waveform has frequency content removed in a passband region of the filter in response to the power gating signal.

21. The processing system of claim 19, wherein a first payload section of the waveform has frequency content removed in a passband region ion of the filter in response to the power gating signal.

22. The processing system of claim 21, wherein a second payload section of the waveform has frequency content removed in the passband region of the filter in response to the power gating signal.

* * * * *